(12) United States Patent
Chen

(10) Patent No.: US 10,723,403 B2
(45) Date of Patent: Jul. 28, 2020

(54) SCOOTER ASSEMBLY WITH AUTO-BALANCING DRIVE WHEEL

(71) Applicant: Shane Chen, Camas, WA (US)

(72) Inventor: Shane Chen, Camas, WA (US)

( * ) Notice: Subject to any disclaimer, the term of this patent is extended or adjusted under 35 U.S.C. 154(b) by 168 days.

(21) Appl. No.: 15/911,171

(22) Filed: Mar. 5, 2018

(65) Prior Publication Data

US 2018/0251182 A1    Sep. 6, 2018

Related U.S. Application Data

(60) Provisional application No. 62/467,182, filed on Mar. 5, 2017.

(51) Int. Cl.
| | | |
|---|---|---|
| B62K 11/00 | (2006.01) | |
| B62K 11/14 | (2006.01) | |
| B62K 13/08 | (2006.01) | |
| B62K 13/00 | (2006.01) | |
| B62H 7/00 | (2006.01) | |
| B62K 3/00 | (2006.01) | |

(52) U.S. Cl.
CPC .............. *B62K 11/007* (2016.11); *B62H 7/00* (2013.01); *B62K 3/002* (2013.01); *B62K 11/14* (2013.01); *B62K 13/00* (2013.01); *B62K 13/08* (2013.01)

(58) Field of Classification Search
CPC ...... B62K 11/007; B62K 11/14; B62K 13/00; B62K 13/02
See application file for complete search history.

(56) References Cited

U.S. PATENT DOCUMENTS

| | | | | |
|---|---|---|---|---|
| 9,403,573 | B1 * | 8/2016 | Mazzei ................. | B62D 51/02 |
| 9,872,805 | B2 * | 1/2018 | Bach Castillo ........ | B62K 5/025 |
| 10,167,038 | B2 * | 1/2019 | Kim ....................... | B62K 11/007 |
| 10,286,977 | B1 * | 5/2019 | Haenel .................. | B62K 27/14 |
| 2004/0129464 | A1 * | 7/2004 | Arling .................. | B62D 51/008 180/7.1 |
| 2010/0237645 | A1 * | 9/2010 | Trainer ................ | G09F 15/0087 296/21 |
| 2011/0220427 | A1 * | 9/2011 | Chen ..................... | B62K 1/00 180/21 |
| 2016/0304159 | A1 * | 10/2016 | Huang ................... | B62M 7/12 |
| 2017/0334501 | A1 * | 11/2017 | Lin ....................... | B62K 11/007 |

* cited by examiner

*Primary Examiner* — Tony H Winner

(57) ABSTRACT

A scooter front end and a scooter device incorporating the front end. The front end may be releasably coupled to an auto-balancing drive wheel unit such as a Solowheel or Iota device. The scooter front end may serve as a training aid, or allow faster speeds or the carrying of goods, etc. The front end may include an ascending control structure that is used to steer the device. A support frame may extend rearwardly from a steerable wheel and provide a mechanism for releasable coupling to the auto-balancing drive wheel unit. Various embodiments for the scooter front end and drive wheel units are disclosed.

16 Claims, 6 Drawing Sheets

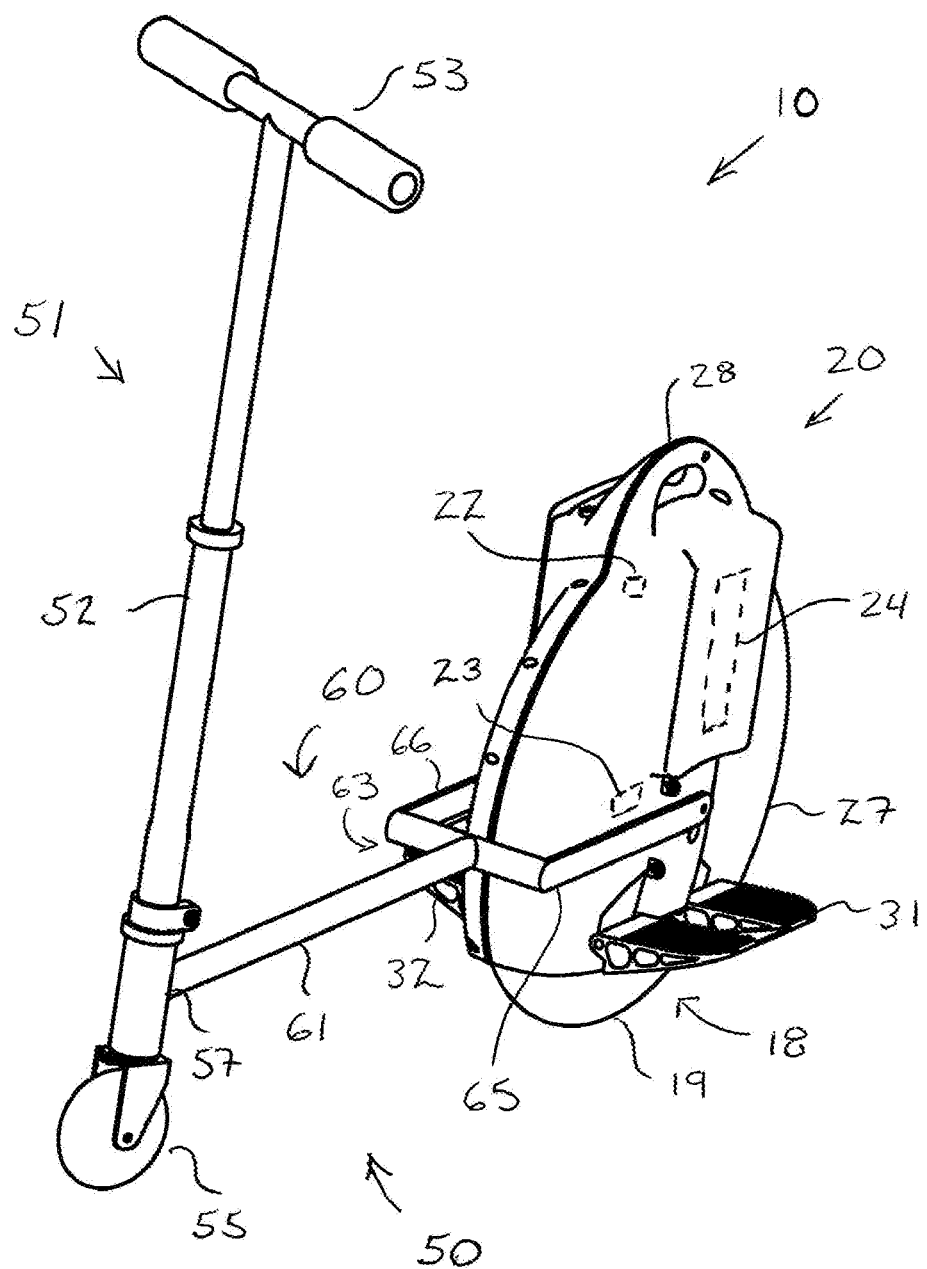

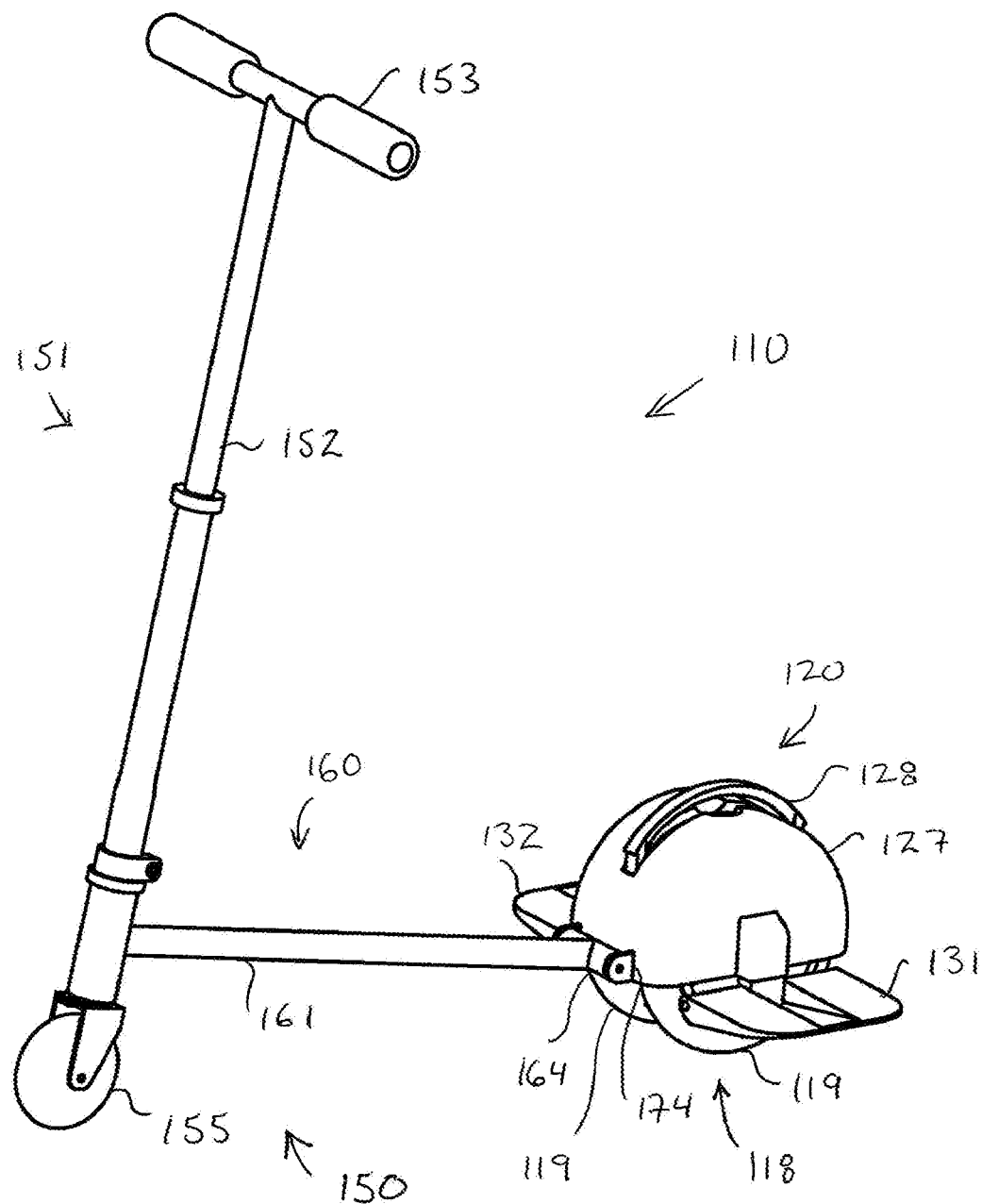

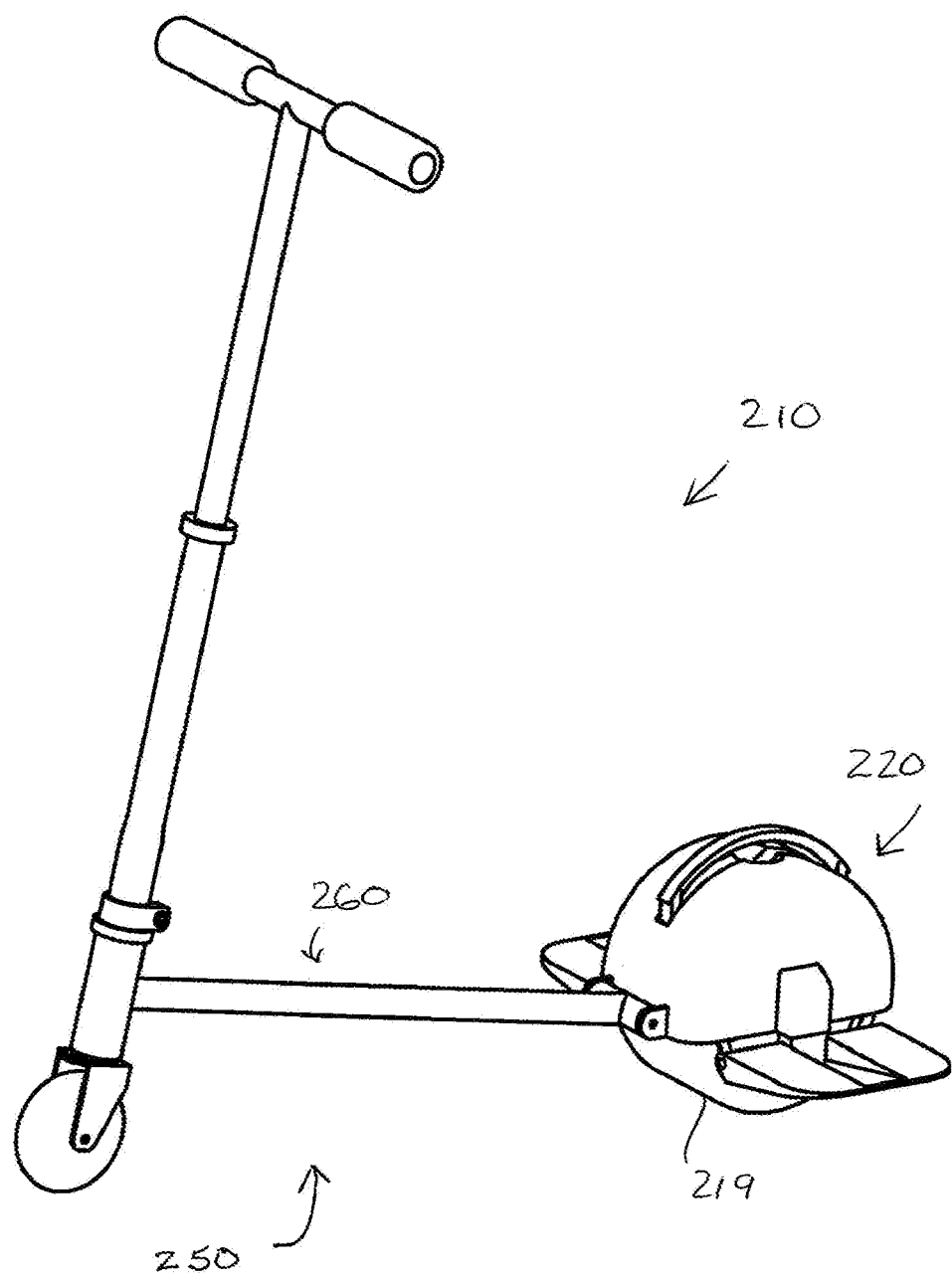

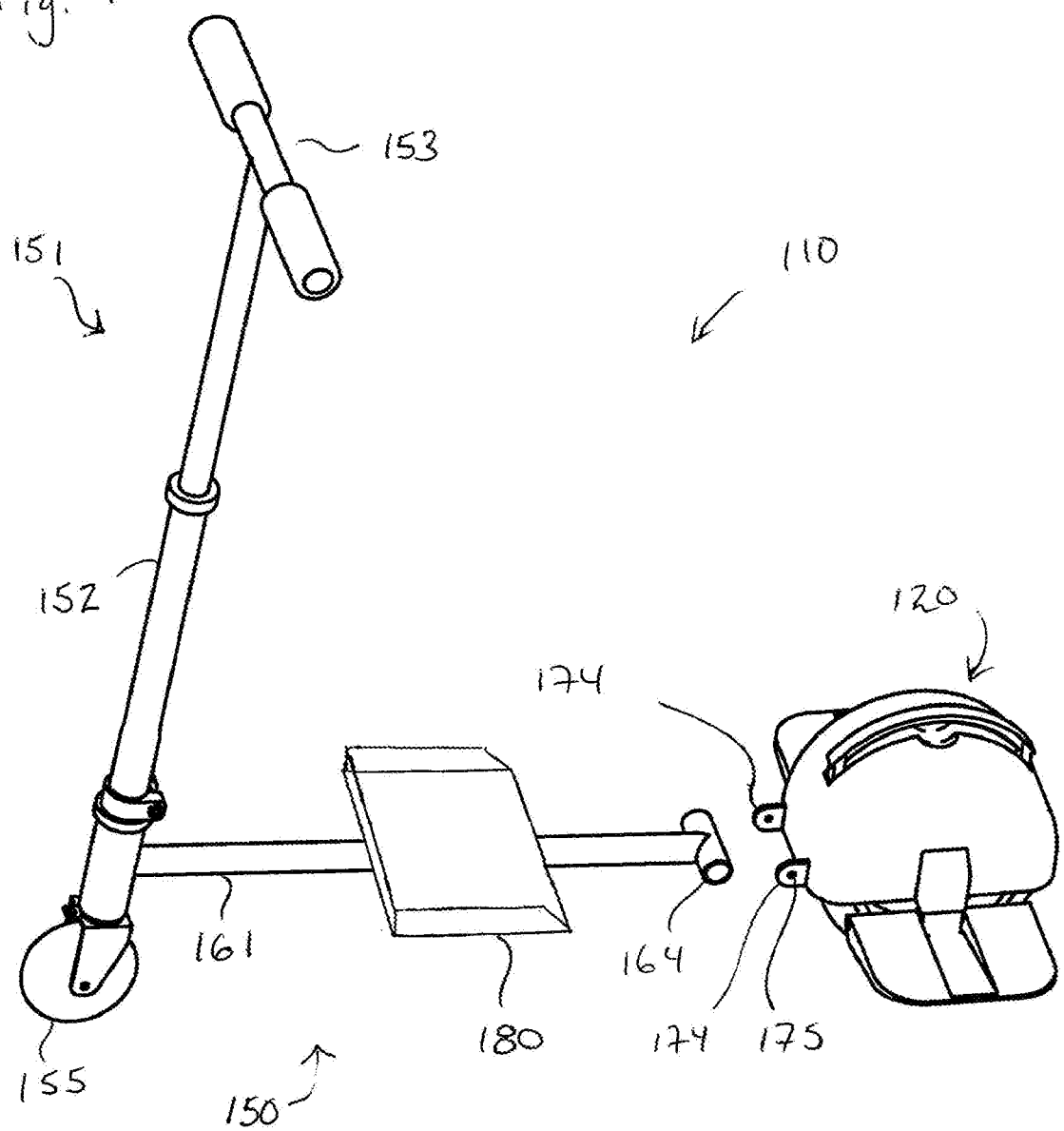

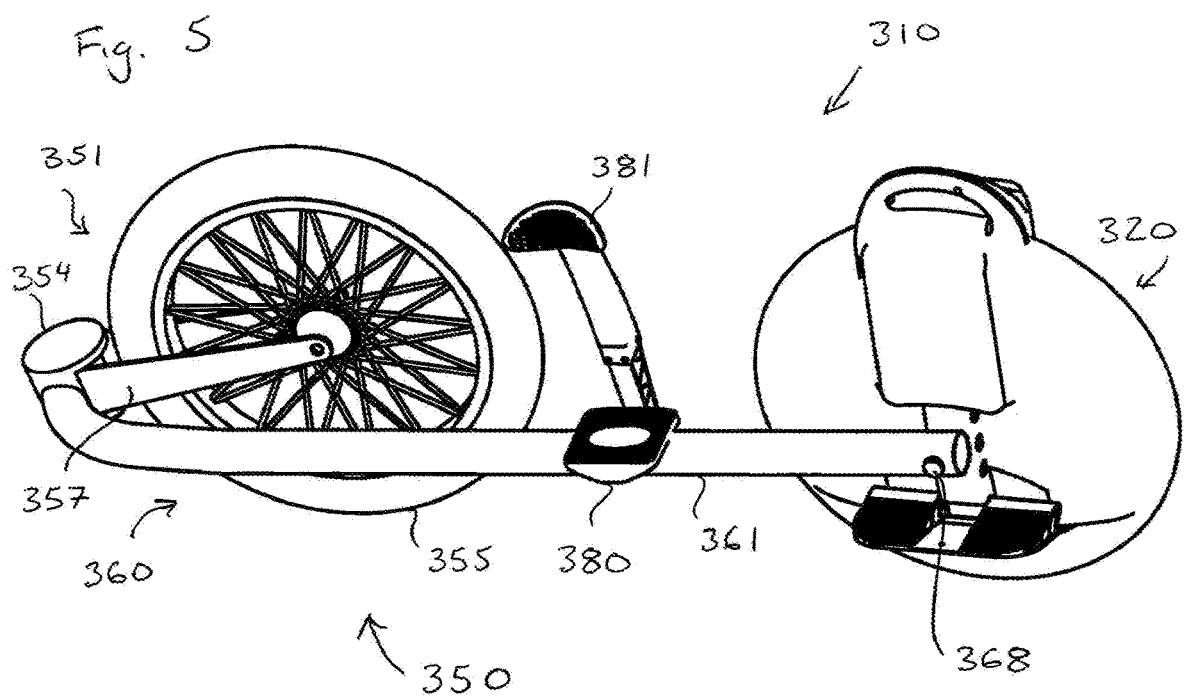

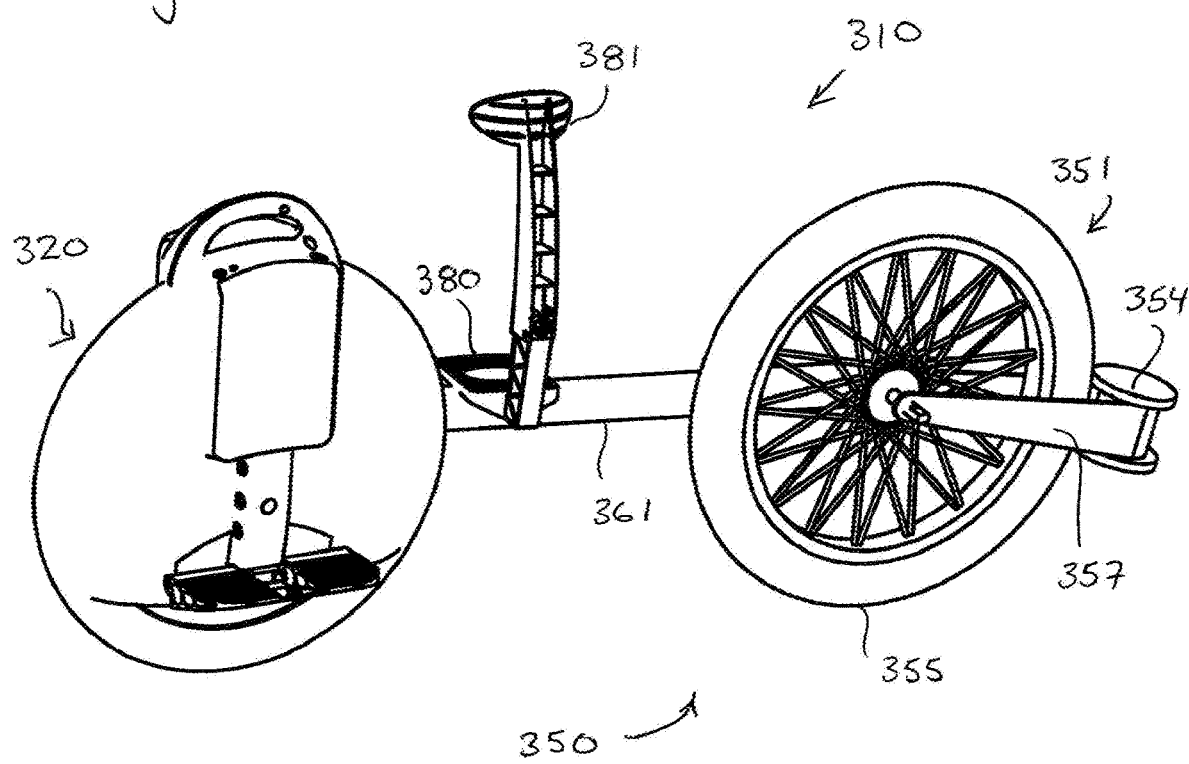

SCOOTER ASSEMBLY WITH AUTO-BALANCING DRIVE WHEEL

CROSS REFERENCE TO RELATED APPLICATIONS

The present application claims the benefit of provisional application No. 62/467,182, filed Mar. 5, 2017, for a Scooter Assembly with Self-Balancing Drive Wheel Unit by the inventor herein.

FIELD OF THE INVENTION

The present invention relates to auto-balancing transportation devices and to scooters.

BACKGROUND OF THE INVENTION

Scooters and scooter assemblies of various types, sizes and uses are known in the art.

More recently, auto-balancing transportation devices have been develop and they include, but are not limited to, the Segwey devices of Kamen et al., and the Solowheel, Hovertrax and Iota devices of Chen.

One disadvantageous aspect of current auto-balancing vehicles is that their maximum speed is relatively low. This is a safety feature. Since balancing can be difficult, particularly for a new rider, a slower speed creates a safer condition for riders. If, however, a support or other structure can be provided that improves balance and/or reduces the probability of a rider falling off, then maximum speed may be increased. The resultant device may be more practical, particularly for a commuter, and more fun.

Also, there is an initial learning curve to riding an auto-balancing device, particularly if there is no handlebar. The provision of a scooter assembly (or related mechanism) as taught herein that assists with balance, yet allows the auto-balancing to function, would be helpful in teaching how to ride such a device. Furthermore, the provision of a scooter assembly would allow greater ease of use, regardless of learning level or desired speed. For example, it would permit a rider to carry an object more confidently, and to carry a heavier object (such as groceries or the like).

In addition, when used with a central wheel structure device (i.e., wheel structure located between the foot platforms), a scooter assembly enhances lateral stability, particularly when the vehicle is in motion.

Hence, a need exists to increase the speed at which an auto-balance driven vehicle may be safely operated, and to improve learning rate, increase ease of use, and enhance stability. There is also a need to do so in a cost-effective manner. The present invention meets these and related needs.

SUMMARY OF THE INVENTION

Accordingly, it is an object of the present invention to overcome the shortcomings of the prior art.

It is also an object of the present invention to provide an auto-balance driven vehicle with enhance stability.

It is another object of the present invention to provide a scooter front end that is coupleable to an auto-balancing device.

It is yet another object of the present invention to provide to provide a scooter that is powered by an auto-balancing transportation device.

These and related objects of the present invention are achieved by use of a scooter assembly as described herein.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIG. 1 is a perspective view of one embodiment of a scooter with an auto-balancing drive wheel unit.

FIG. 2 is a perspective view of another embodiment of a scooter with an auto-balancing drive wheel unit.

FIG. 3 is a perspective view of yet another embodiment of a scooter assembly with an auto-balancing drive wheel unit.

FIG. 4 is a perspective view illustrating decoupling/recoupling of the front end and DWU of the scooter device of FIG. 2.

FIGS. 5 and 6 are a left and a right side perspective view of another embodiment of a scooter device in accordance with the present invention is shown.

DETAILED DESCRIPTION

Referring to FIG. 1, a perspective view of one embodiment of a scooter device 10 with an auto-balancing drive wheel unit 20 in accordance with the present invention is shown. Device 10 may include the auto-balancing drive wheel unit ("DWU") 20 and a scooter front end section 50.

In FIG. 1, DWU 20 may be a Solowheel or similar device. The Solowheel is described in U.S. Pat. No. 8,807,250, entitled Powered Single-Wheeled Self-Balancing Vehicle for Standing Use, by Chen (the '250 patent), which is hereby incorporated by reference. DWU 20 may include a gyroscopic or other position sensor 22, an electronic control circuit 23, a battery 24, and a drive motor (obscured from view) which may be a hub motor or friction drive motor or other. A housing 27 may cover portions of wheel 18 and a handle 28 may be provided at the top.

First and second foot platforms 31,32 are provided on opposite sides of wheel 18. The foot platforms may be fixed position or move between in-use and stowage positions (FIG. 1 shows an in-use position). Wheel 18 is shown with one tire 19, though it may be configured with two (or more) tires on the same rim or on different, yet-fixedly coupled, rims. The term "single wheel structure" is intended to include single tire embodiments and multiple tired embodiments when they are mounted on a single rim or multiple, fixedly coupled rims.

As is known, the device of the '250 patent (i.e., DWU 20) functions by detecting fore-aft pitch position and driving wheel 18 based on the detected position. DWU 20 and like devices may be referred to as "foot controlled" devices because they are operated by a user's foot. A rider controls the device by shifting weight between the ball or heel of their feet as appropriate to achieve the desired direction and speed.

The scooter front end 50 may include an ascending steering structure 51 and a support frame 60 that extends rearwardly towards and couples to DWU 20. Steering structure 51 may include an ascending shaft 52, a handle or handle bar 53 coupled towards a top thereof, and a steering wheel 55 coupled at the bottom. Movement off the handlebar causes a corresponding movement in wheel 55 to achieve turning. The height of shaft 52, and hence the handle bar, may be adjustable. Various handle bar/steering arrangements for scooters are known and may be used without departing from the present invention. A caster, biased caster and/or lean based steering may be used as well. If a caster (or biased caster is used) a knob or ball or other handheld member (including a handle or handlebar) may be (optionally) mounted on shaft 53, for example, like a large joystick. The rider may hold the knob and lean/move it from side to side to affect turning.

Furthermore, while only one wheel is shown, it should be recognized that a second (paired) wheel or the like may be provided with wheel 55.

While frame 60 may take many forms, in FIG. 1, frame includes a longitudinal member 61 that extends rearwardly and terminates at a fork 63. Fork 63 has tines or coupling supports 65,66 with a distal end preferably configured to couple to DWU 20.

Fork 63 and coupling supports 65,66 are preferably configured with DWU 20 such that the DWU may rotate or pitch fore-aft relative to frame 60. In this manner, the DWU functions largely independently of scooter front-end 50 and hence can be driven forward or backward (and fast or slow) by the rider by applying pressure (as described above) through the balls or heels of their feet. While this is happening, the scooter front end provides support, steering, stability, ease of use, and added comfort.

DWU 20 is preferably coupled to the scooter front end 50 in such a way that it is movable (i.e., rotatable) to achieve the fore or aft movement necessary to drive wheel 18. This coupling may be a more secure or fixed movable coupling (as in a dedicated scooter embodiment) or a releasable coupling (as in an add-on feature to render the DWU a scooter). Various mechanisms for fixed movable and detachable movable coupling are known in the art.

The joint 57 between shaft 52 and frame 60 may be foldable or detachable or otherwise movable to achieve a more compact form for stowage. A kick stand, not shown, may also be provided, along with other scooter components including lights, reflectors, etc.

Device 10 achieves many benefits. These include meeting the needs discussed in the Background section above, and effectively offering to a user two distinct devices. One is a low cost automatic scooter that is fun to ride and achieves more desired speeds and in a safer manner, and the other is the stand alone (i.e., non-scooter) auto-balancing transportation device (20), realized when the scooter front end 50 is detached. Adding to the fun of riding in the scooter embodiment, device 10 (and 110,210) is well suited for wheelies and other stunts.

Referring to FIG. 2, a perspective view of another embodiment of a scooter 110 with auto-balancing drive wheel unit 120 in accordance with the present invention is shown. Device 110 is similar to device 10 in many ways, and includes a DWU 120 and a scooter front end 150.

Differences include that the DWU 120 is an Iota instead of a Solowheel. Iota and Solowheel are commercially available products. The Iota has a "single wheel structure" 118 that preferably includes two tires 119 mounted on a single rim. Since there is a single rim, the tires rotate at the same speed and hence resemble a "single wheel." These tires may have an air inner-connect to achieve air-pressure equalization between the two tires. DWU 120 includes a position sensor, control electronics, battery and drive motor (as discussed above for DWU 20) and right and left foot platforms 131,132, a housing 127, a handle 128, and related components.

Scooter front end 150 includes an ascending steering structure (having a shaft 152, handle/handle bar 153, and steerable front wheel 155) and a support frame 160.

While frame 160 may have a longitudinal frame member 161 similar to frame member 61 of device 10, the coupling arrangement in device 110 is different. FIG. 2 illustrates a coupling member or bar 164 that is preferably coupled to a mounting bracket 174 on DWU 120 in a manner that achieves rotational or pivoting movement of front end 150 relative to DWU 120. In this manner, direction and speed at which wheel 118 is driven is input through the heels/balls of a rider's foot on the foot platforms.

The two tires of DWU 120 may also provide increased lateral stability.

Referring to FIG. 3, a perspective view of yet another embodiment of a scooter 210 with an auto-balancing drive wheel unit 220 in accordance with the present invention is shown. Scooter 210 is similar to device 110 of FIG. 2 yet has a DWU 220 with a single broad tire 219 instead of two thinner tires. Device 210 also has a scooter front end 250 and a frame 260.

Referring to FIG. 4, a perspective view illustrating decoupling/recoupling of front end 150 from/to DWU 120 (of FIG. 2) is shown. It can be seen that coupling member or bar 164 fits within brackets 174 on the DWU. Releasable fasteners (e.g., pivot pin, etc.) or other couplers may be inserted through pivot holes 175 to secure bar 164 and hence the scooter front end to DWU 120. This arrangement allows pivotal (up-down) movement of front end 150 relative to DWU 120. Whether device 10,110 or 210, the DWU preferably rotates in an arc having an axis that is substantially perpendicular to a longitudinal axis traversing (from front to back) the support frame.

Coupling bar 164 or the like may have a bias mechanism therein that returns the position of the DWU and scooter front end to a neutral position (0 pitch angle) in the absence of a counter-bias displacement force.

FIG. 4 illustrates one embodiment for detachable connection. Many different coupling arrangements may be used without departing from the present invention. An important aspect of any arrangement is that it allows pivotal or rotational movement between the two portions so that the DWU may move (rotate) in fore-aft to drive the device.

FIG. 4 also illustrates a frame platform 180. The platform is preferably coupled to frame 160 and may provide several benefits. One is that a rider may place a foot on platform 180, thereby weighting the front end of the scooter and causing better or more assured contact between steering wheel 155 and ground. Another benefit is that platform 180 provides a rider with different standing positions, which lessens muscle fatigue and may make the riding experience more enjoyable. Yet another benefit is that platform 180 may be used for lightweight cargo, such as some groceries or other items. In addition or as an alternative, panniers or the like may added to the steering assembly for carrying items. To this end, a support wheel may be added at the rear of frame 160 (between the platform and coupling mechanism) to support a load. In this case, the attachment to the DWU must allow the DWU to rotate fore-aft for device control, whether this includes a "slide" in the coupling bracket that allows this movement, or forks like those of device 10, or another arrangement.

Referring to FIGS. 5 and 6, left and right side perspective views of another embodiment of a scooter device 310 in accordance with the present invention is shown. Device 310 includes an auto-balancing drive wheel unit 320 and a scooter front end 350. The DWU 320 may be the same as DWU 20 discussed above with reference to FIG. 1.

Scooter front end 350 preferably includes a steering structure 351 and a support frame 360. Support frame 360 may include a longitudinal frame member 361 that is coupled to a head tube 354 and extends rearwardly therefrom to DWU 320, to which it may be releasably coupled. A platform 380 is coupled to frame member 361. This platform permits a rider to place a foot forward onto frame 360. A lower leg brace or contact member 381 may ascend above the platform, thereby providing a rider with additional control and/or comfort.

While the DWU coupling region of frame member 361 is shown as a single rod, this region may terminate in a fork or the like, e.g., as shown in FIG. 1 for device 10. FIG. 5 illustrates a removable coupling pin 368 for releasably coupling support frame 360 to DWU 320.

A front wheel 355 may be coupled by forks 357 to head tube 354. Similar to in a bicycle, head tube 354 includes a pivot that permits wheel 355 to pivot relative to frame member 361, thus turning device 310.

Platform 380 provides the benefits of platform 180, for example, weighting the front end and providing different standing positions, in addition to some steering control.

It should be recognized that use of the DWU as a scooter or as a standalone unit might involve different preferred speeds. The scooter can be driven faster. In this situation, various techniques may be used to address appropriate speed. One approach is to sense connection of the scooter front end and to have different operation speeds or ranges based on the present or absence of the front end. Another approach is mode settings that allow a user to select the operating "mode" from among scooter and stand alone and even beginner or advanced, etc., within those modes.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A scooter assembly device, comprising:
   a wheel assembly that is located forward in the device and has at least a first wheel;
   a frame member that extends rearwardly from the wheel assembly;
   a control structure that ascends from at least one of the wheel assembly and frame member; and
   a coupling mechanism that affords coupling of an item to the frame member in a manner that allows movement of that coupled item relative to the frame member; and
   wherein the wheel assembly includes at least a first wheel support member pivotally coupled to the frame member forward of the axis of rotation of the first wheel so that the first wheel may pivot relative to the frame member to achieve turning.

2. The device of claim 1, further comprising a weight bearing platform that is supported by the frame member, the platform located forward of the coupling mechanism.

3. The device of claim 2, wherein the control structure includes a lower leg contact member positioned above the platform.

4. The device of claim 1, wherein the wheel assembly is the only wheel assembly forward of the coupling mechanism.

5. The device of claim 1, wherein the coupling mechanism is configured for releasable coupling.

6. The device of claim 1, wherein the movement afforded by the coupling mechanism is pivotal up-down movement of a coupled item relative to the frame member.

7. The device of claim 1, wherein the movement afforded by the coupling mechanism is rotation of the coupled item through an arc having an axis of rotation that is substantially perpendicular to a longitudinal axis of the frame member.

8. The device of claim 1, wherein the coupled item is an auto-balancing drive wheel unit.

9. A scooter assembly device, comprising:
   a wheel assembly that is located forward in the device and has at least a first wheel;
   a support frame that extends rearwardly from the forward wheel assembly;
   a control structure that ascends from at least one of the wheel assembly and support frame;
   a coupling mechanism that affords coupling of an item to the support frame in a manner that allows movement of that coupled item relative to the support frame; and
   a weight bearing platform that is supported by the support frame, the platform located forward of the coupling mechanism;
   wherein the wheel assembly includes at least a first wheel support member pivotally coupled to the support frame forward of the axis of rotation of the first wheel so that the first wheel may pivot relative to the support frame to achieve turning.

10. The device of claim 9, wherein the control structure includes a lower leg contact member coupled to the support frame and positioned above the platform.

11. The device of claim 9, wherein the movement afforded by the coupling mechanism is rotation of the coupled item through an arc having an axis of rotation that is substantially perpendicular to a longitudinal axis of the support frame.

12. The device of claim 9, wherein the coupled item is an auto-balancing drive wheel unit.

13. The device of claim 9, wherein the coupling mechanism is configured for releasable coupling.

14. A scooter device, comprising:
   a wheel assembly that is located forward in the device and has at least a first wheel;
   a support frame that extends rearwardly from the wheel assembly;
   a control structure that ascends from at least one of the wheel assembly and support frame;
   an auto-balancing drive wheel unit; and
   a coupling mechanism that affords coupling of the drive wheel unit to the support frame in a manner that allows movement of the drive wheel unit relative to the support frame;
   wherein the wheel assembly includes at least a first wheel support member pivotally coupled to the support frame forward of the axis of rotation of the first wheel so that the first wheel may pivot relative to the support frame to achieve turning.

15. The device of claim 14, wherein the movement afforded by the coupling mechanism is rotation of the drive wheel unit through an arc having an axis of rotation that is substantially perpendicular to a longitudinal axis of the support frame.

16. The device of claim 14, wherein the coupling mechanism is configured for releasable coupling.

\* \* \* \* \*